US009129150B2

(12) United States Patent
Irimoto

(10) Patent No.: US 9,129,150 B2
(45) Date of Patent: Sep. 8, 2015

(54) ELECTRONIC APPARATUS AND DISPLAY CONTROL METHOD

(71) Applicant: KABUSHIKI KAISHA TOSHIBA, Tokyo (JP)

(72) Inventor: Yuuji Irimoto, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 44 days.

(21) Appl. No.: 14/101,122

(22) Filed: Dec. 9, 2013

(65) Prior Publication Data

US 2014/0348398 A1 Nov. 27, 2014

(30) Foreign Application Priority Data

May 24, 2013 (JP) ................................. 2013-109796

(51) Int. Cl.
*G06K 9/00* (2006.01)
(52) U.S. Cl.
CPC ........ *G06K 9/00288* (2013.01); *G06K 9/00677* (2013.01)
(58) Field of Classification Search
CPC .......... G06K 9/00288; G06K 9/00248; G06K 9/00268; G06K 9/00221; G06K 9/00677; G06K 9/00926; G06F 3/04817; G06F 17/30247
See application file for complete search history.

(56) References Cited

U.S. PATENT DOCUMENTS

| 7,146,576 | B2* | 12/2006 | Chang et al. ................. 715/848 |
| 2003/0009469 | A1* | 1/2003 | Platt et al. .................... 707/100 |
| 2011/0129126 | A1* | 6/2011 | Begeja et al. ................ 382/118 |
| 2012/0054687 | A1* | 3/2012 | Kawabata ..................... 715/836 |
| 2012/0281887 | A1* | 11/2012 | Yamaguchi ................... 382/118 |
| 2013/0239063 | A1* | 9/2013 | Ubillos et al. ............... 715/838 |

FOREIGN PATENT DOCUMENTS

| JP | 2003-058559 | 2/2003 |
| JP | 2012-069097 | 4/2012 |
| JP | 2012-128724 | 7/2012 |

* cited by examiner

*Primary Examiner* — Edward Park
(74) *Attorney, Agent, or Firm* — Knobbe Martens Olson & Bear LLP

(57) ABSTRACT

According to at least one embodiment, an electronic apparatus includes a detector, a classifier and a display controller. The detector detects face images in images. The classifier classifies, based on the face images, one or more images corresponding to a first face into a first group and one or more images corresponding to a second face into a second group. The display controller displays on a screen, if a number of images in the first group is greater than or equal to a threshold and a number of images in the second group is less than the threshold, a first representative image of the first group that is distinguishable from a second representative image of the second group.

13 Claims, 9 Drawing Sheets

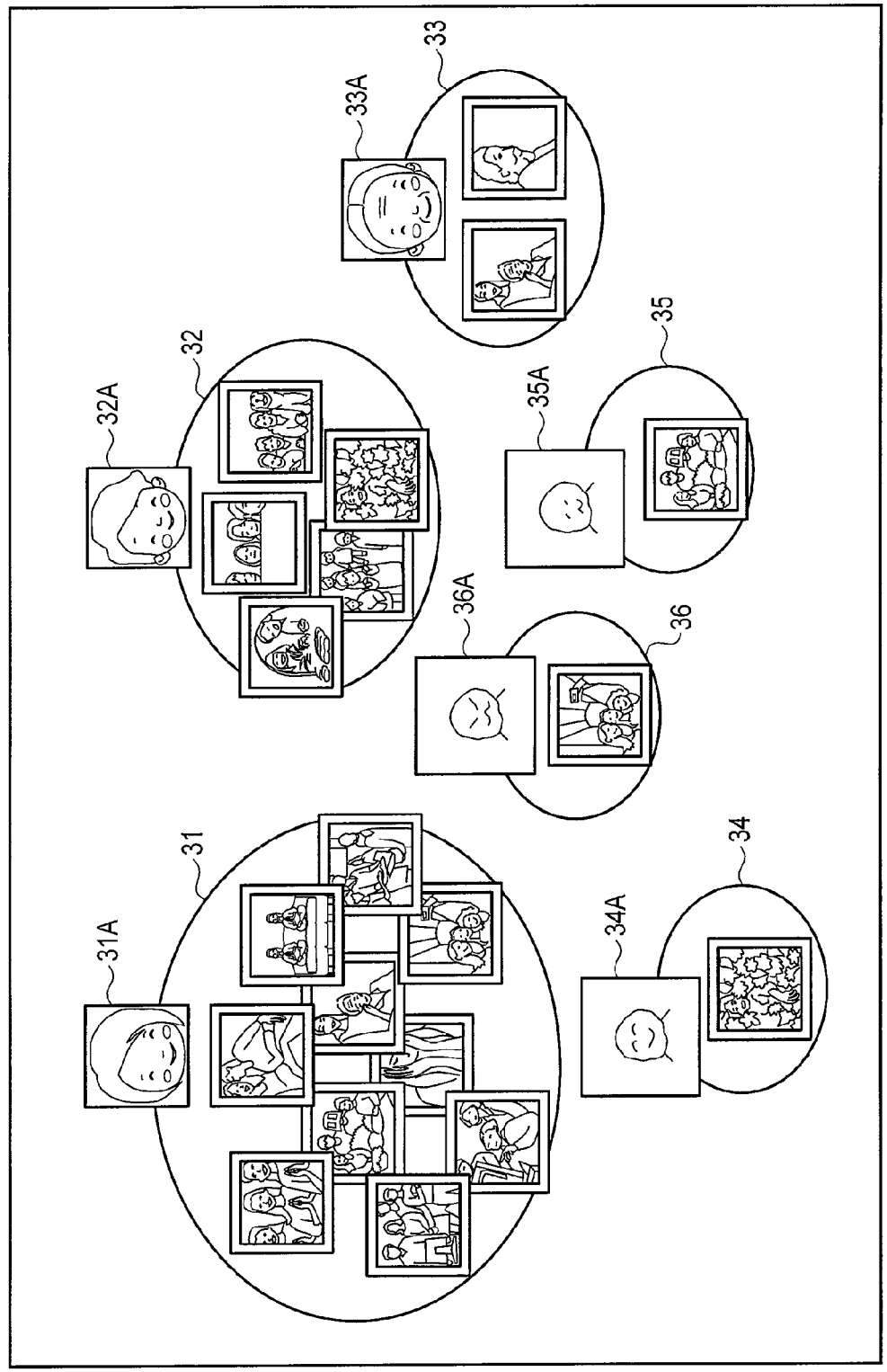
F I G. 3

| Group No. | Name | Number of images | ... |
|---|---|---|---|
| : | : | : | ... |
| : | : | : | ... |

FIG. 8

| Face image ID | Image ID | Group No. | Position | Size | Frontality | Sharpness | Evaluation value | ... |
|---|---|---|---|---|---|---|---|---|
| : | : | : | : | : | : | : | : | ... |
| : | : | : | : | : | : | : | : | ... |

FIG. 9

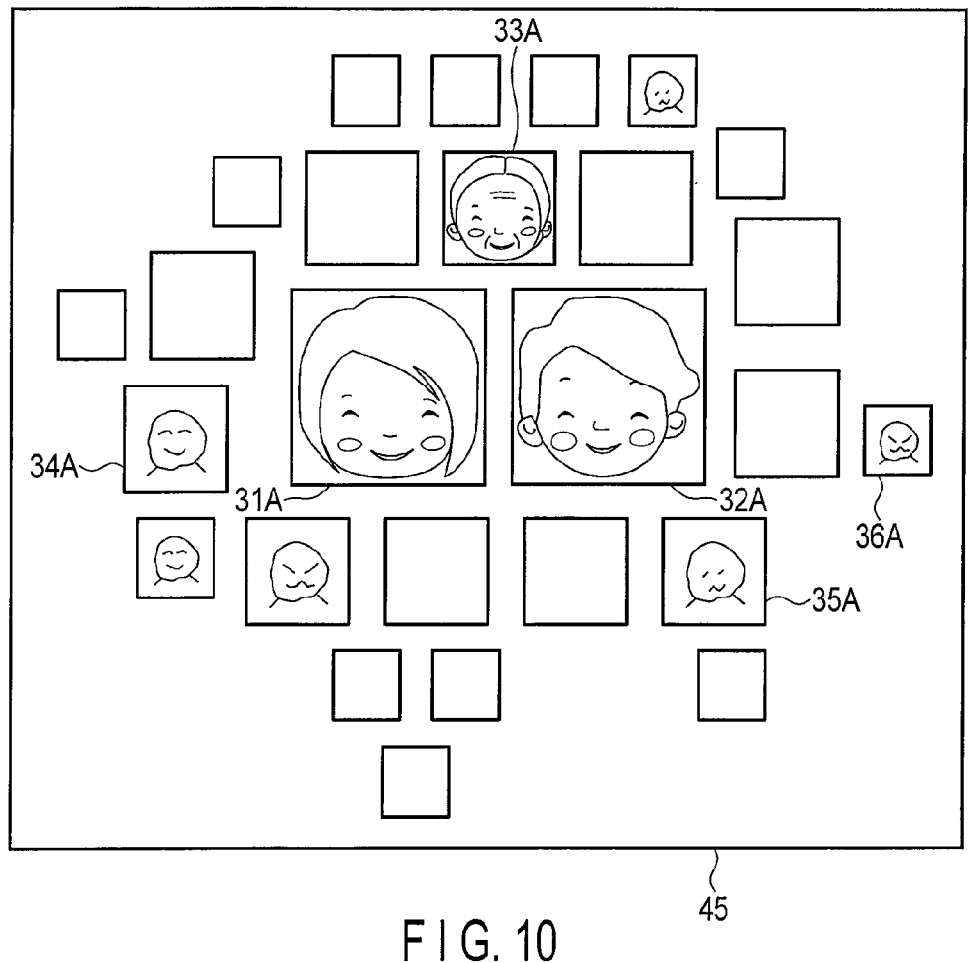
F I G. 10
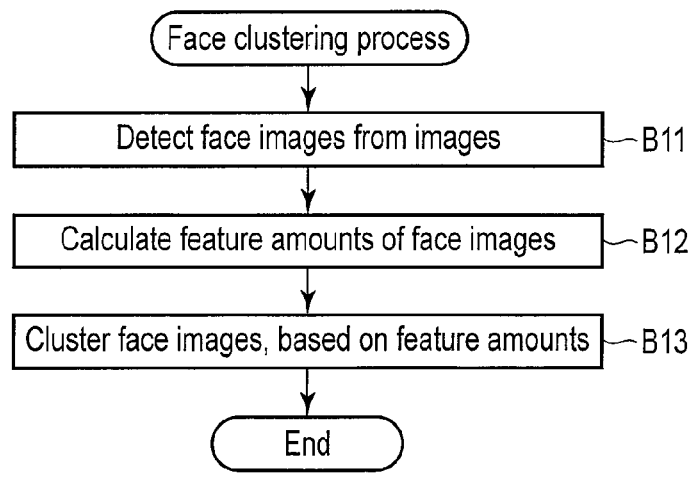
F I G. 11

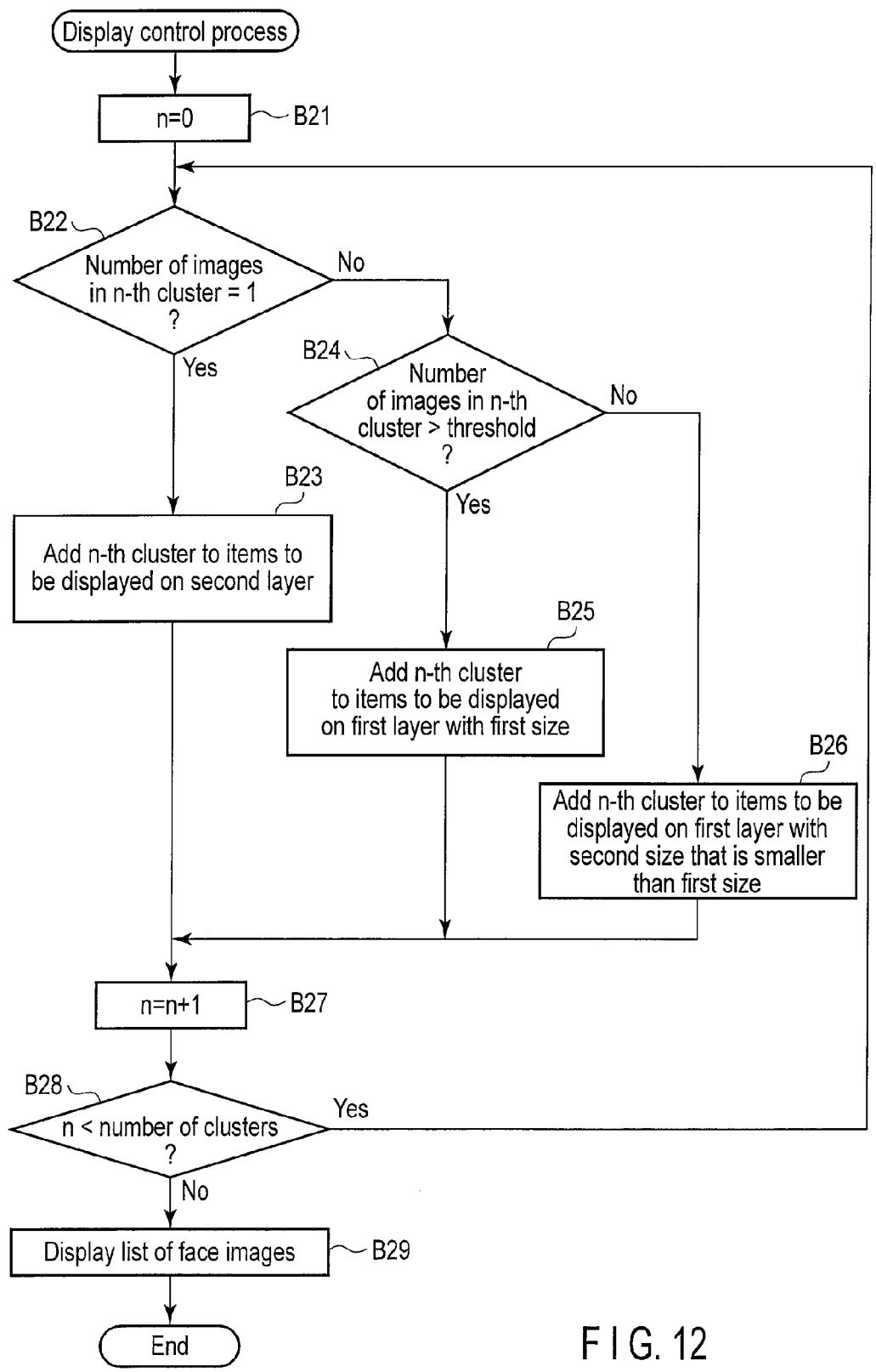
F I G. 12

ELECTRONIC APPARATUS AND DISPLAY CONTROL METHOD

CROSS-REFERENCE TO RELATED APPLICATIONS

This application is based upon and claims the benefit of priority from Japanese Patent Application No. 2013-109796, filed May 24, 2013, the entire contents of which are incorporated herein by reference.

FIELD

Embodiments described herein relate generally to an electronic apparatus which supports management of images, and a display control method applied to the electronic apparatus.

BACKGROUND

With the popularity of various kinds of electronic devices having camera functions and the increase in capacity of storage media, opportunities at which even general users handle many image files (photo files) have been increased.

Thus, various kinds of image management software for supporting users in searching for a desired image file from many image files. In such image management software, for example, images can be displayed in an order based on generated dates of images. Using the date as a key, the user can retrieve a desired image from the displayed images.

In some cases, such images are displayed based on face images in the respective images. For example, images are displayed as an image group including similar face images (i.e. face images of the same person). Using the face image (person) as a key, the user can search for an image of a desired person.

However, when face images of many persons are detected from many images which are a target of management, there is a possibility that it is difficult to find a face image that becomes a key, from face images of many persons.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a view illustrating an example in which images are classified into groups, based on face images.

FIG. 8 is a view illustrating a structure example of group data used by the electronic apparatus of the embodiment.

FIG. 9 is a view illustrating a structure example of face image data used by the electronic apparatus of the embodiment.

FIG. 10 is a view illustrating another example of the list of representative images based on the groups in FIG. 3, the list being displayed by the electronic apparatus of the embodiment.

FIG. 11 is a flowchart illustrating an example of the procedure of a face clustering process executed by the electronic apparatus of the embodiment.

FIG. 12 is a flowchart illustrating an example of the procedure of a display control process executed by the electronic apparatus of the embodiment.

DETAILED DESCRIPTION

Various embodiments will be described hereinafter with reference to the accompanying drawings.

In general, according to one embodiment, an electronic apparatus includes a detector, a classifier and a display controller. The detector is configured to detect face images in images. The classifier is configured to classify, based on the face images, one or more images corresponding to a first face into a first group and one or more images corresponding to a second face into a second group. The display controller is configured to display on a screen, if a number of images in the first group is greater than or equal to a threshold and a number of images in the second group is less than the threshold, a first representative image associated with the first group is distinguishable from a second representative image associated with the second group, the first representative image corresponding to one of images in the first group, the second representative image corresponding to one of images in the second group.

Figure 1:
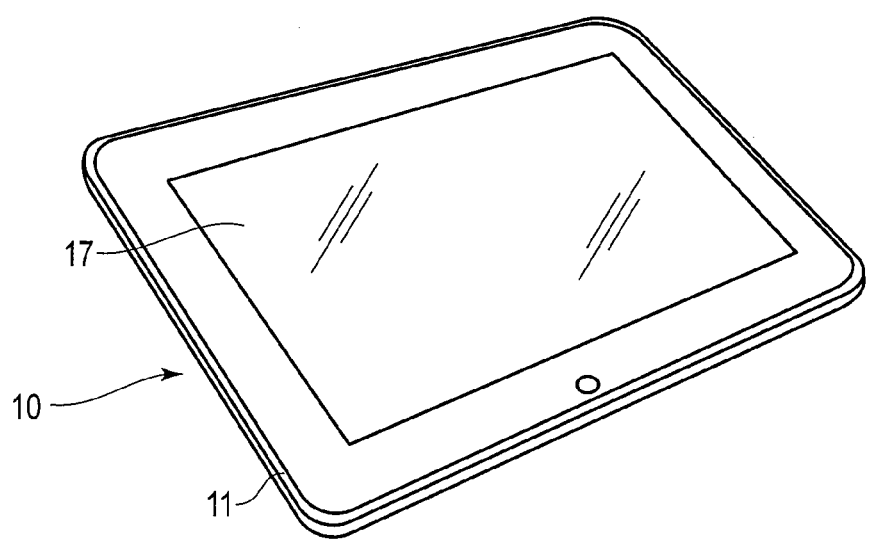
FIG. 1 is an exemplary perspective view illustrating an external appearance of an electronic apparatus according to an embodiment.

FIG. 1 is a perspective view illustrating an external appearance of an electronic apparatus according to an embodiment. The electronic apparatus may be realized as a tablet computer, a notebook-type personal computer, a smartphone, a PDA, or an embedded system built in various kinds of electronic apparatuses such as a digital camera. In the description below, the case is assumed that this electronic apparatus is realized as a tablet computer 10. The tablet computer 10 is a portable electronic apparatus which is also called "tablet" or "slate computer". As shown in FIG. 1, the tablet computer 10 includes a main body 11 and a touch-screen display 17. The touch-screen display 17 is attached such that the touch-screen display 17 is laid over the top surface of the main body 11.

The main body 11 has a thin box-shaped housing. In the touch-screen display 17, a flat-panel display and a sensor are assembled. The sensor is configured to detect a touch position of a pen or a finger on the screen of the flat-panel display. The flat-panel display may be, for instance, a liquid crystal display (LCD). As the sensor, for example, use may be made of an electrostatic capacitance-type touch panel, or an electromagnetic induction-type digitizer.

In addition, the main body 11 is provided with a camera module for capturing an image (photo) from a back side of the main body 11.

Figure 2:
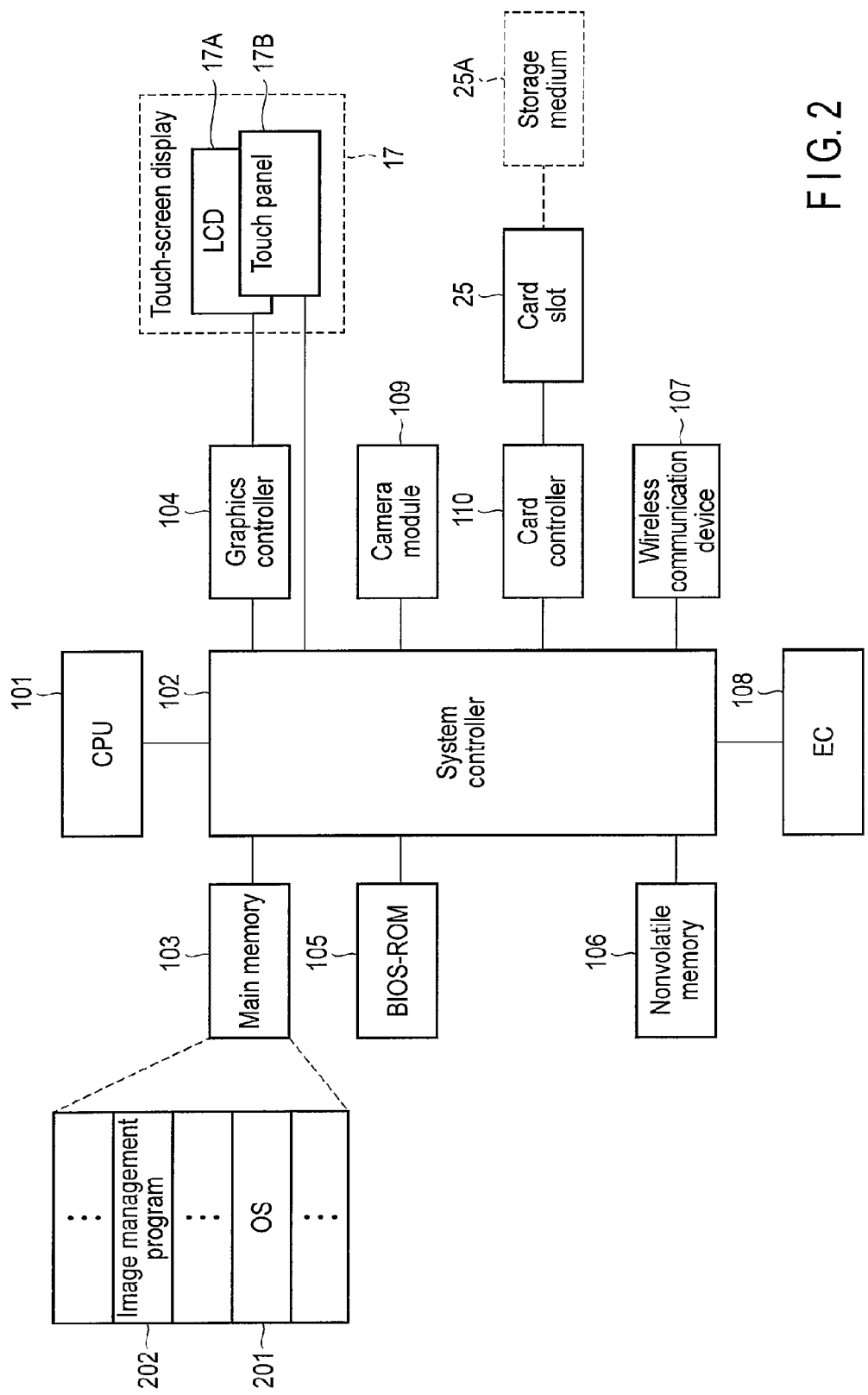
FIG. 2 is an exemplary block diagram illustrating a system configuration of the electronic apparatus of the embodiment.

FIG. 2 shows an example of a system configuration of the tablet computer 10.

As shown in FIG. 2, the tablet computer 10 includes a CPU 101, a system controller 102, a main memory 103, a graphics controller 104, a BIOS-ROM 105, a nonvolatile memory 106, a wireless communication device 107, an embedded controller (EC) 108, a camera module 109, and a card controller 110.

The CPU 101 is a processor which controls the operations of various components in the tablet computer 10. The CPU 101 executes various kinds of software, which are loaded from the nonvolatile memory 106 that is a storage device into the main memory 103. The software includes an operating system (OS) 201 and various application programs. The application programs include an image management program 202. The image management program 202 includes, for example, a function of managing images (image files) photographed by using the camera module 109, images stored in the nonvolatile memory 106, and images (imported images) which are taken in from an external storage medium or an external storage device.

In addition, the CPU 101 executes a basic input/output system (BIOS) which is stored in the BIOS-ROM 105. The BIOS is a program for hardware control.

The system controller 102 is a device which connects a local bus of the CPU 101 and various components. The system controller 102 includes a memory controller which access-controls the main memory 103. In addition, the system controller 102 includes a function of communicating with the graphics controller 104 via, e.g. a PCI EXPRESS serial bus.

The graphics controller 104 is a display controller which controls an LCD 17A that is used as a display monitor of the tablet computer 10. A display signal, which is generated by the graphics controller 104, is sent to the LCD 17A. The LCD 17A displays a screen image based on the display signal. A touch panel 17B is disposed on the LCD 17A.

The wireless communication device 107 is a device configured to execute wireless communication such as wireless LAN or 3G mobile communication. The EC 108 is a one-chip microcomputer including an embedded controller for power management. The EC 108 includes a function of powering on or powering off the tablet computer 10 in accordance with an operation of a power button by the user.

The camera module 109 captures an image, for example, in response to the user's touching (tapping) a button (graphical object) which is displayed on the screen of the touch-screen display 17.

The card controller 110 communicates with a recording medium 25A which is inserted in a card slot 25. The card controller 110 executes, for example, communication at a time of reading an image file stored in an SD card that is the recording medium 25A and storing the image file in the nonvolatile memory 106.

As described above, the image management program 202, which is executed by the tablet computer 10, includes the function of managing images (image files). The image management program 202 can classify, for example, images based on persons.

For example, as illustrated in FIG. 3, images including face images, which are estimated to represent the face of the same person, are classified into the same group (cluster) by using face images in each of images. Each of images belonging to a group 31 includes a face image which is estimated to represent the face of a person of a representative image 31A. Each of images belonging to a group 32 includes a face image which is estimated to represent the face of a person of a representative image 32A. Each of images belonging to a group 33 includes a face image which is estimated to represent the face of a person of a representative image 33A. Similarly, each of images belonging to groups 34, 35 and 36 includes a face image which is estimated to represent the face of a person of a representative image 34A, 35A and 36A.

Figure 4:
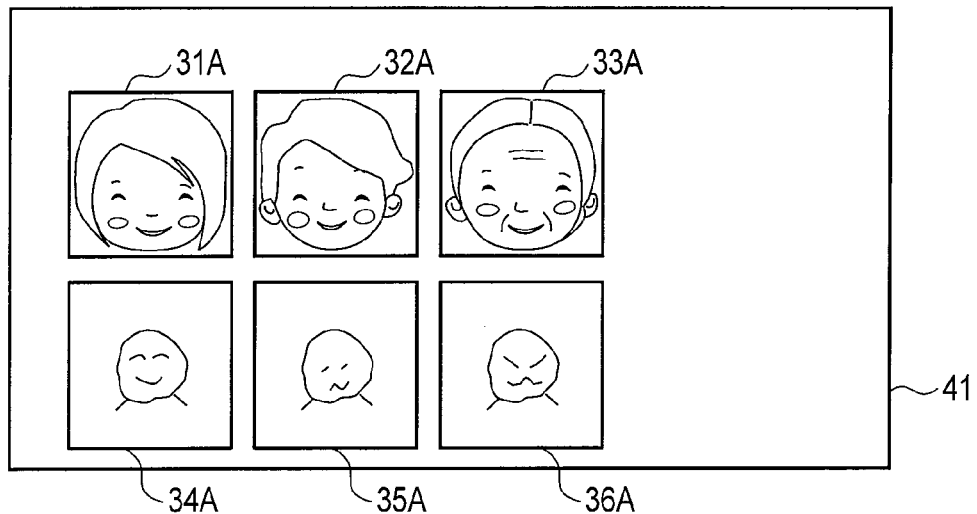
FIG. 4 is a view illustrating an example in which a list of representative images based on the groups in FIG. 3 is displayed.

As illustrated in FIG. 4, based on the classification result of FIG. 3, a list 41 of representative images (persons) of the respective groups, into which the images have been classified, can also be displayed on the screen. This list 41 of representative images includes representative images (e.g. face images) 31A to 36A which are associated with groups 31 to 36 into which images have been classified.

However, when the representative images 31A to 33A of persons detected from many images and the representative images 34A to 36A of persons detected from a very small number of images (e.g. one image), compared to the other persons, are displayed on the list 41 without distinction, it is possible that the list 41 with complicated contents would be displayed, despite the images being classified based on persons (face images). For example, when the list 41 includes representative images of many persons (e.g. 100 persons), it may become very time-consuming for a user to search for a representative image of a desired person from the list 41.

Figure 5:
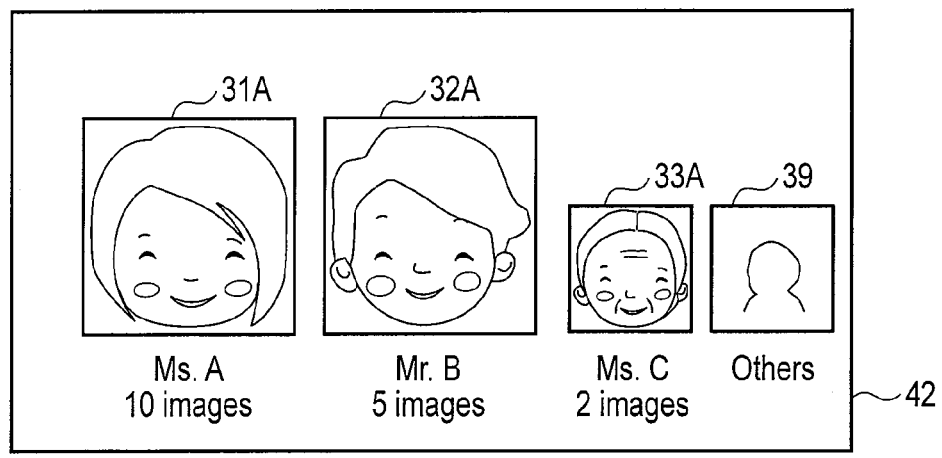
FIG. 5 is a view illustrating an example of a list of representative images based on the groups in FIG. 3, the list being displayed by the electronic apparatus of the embodiment.
Figure 6:
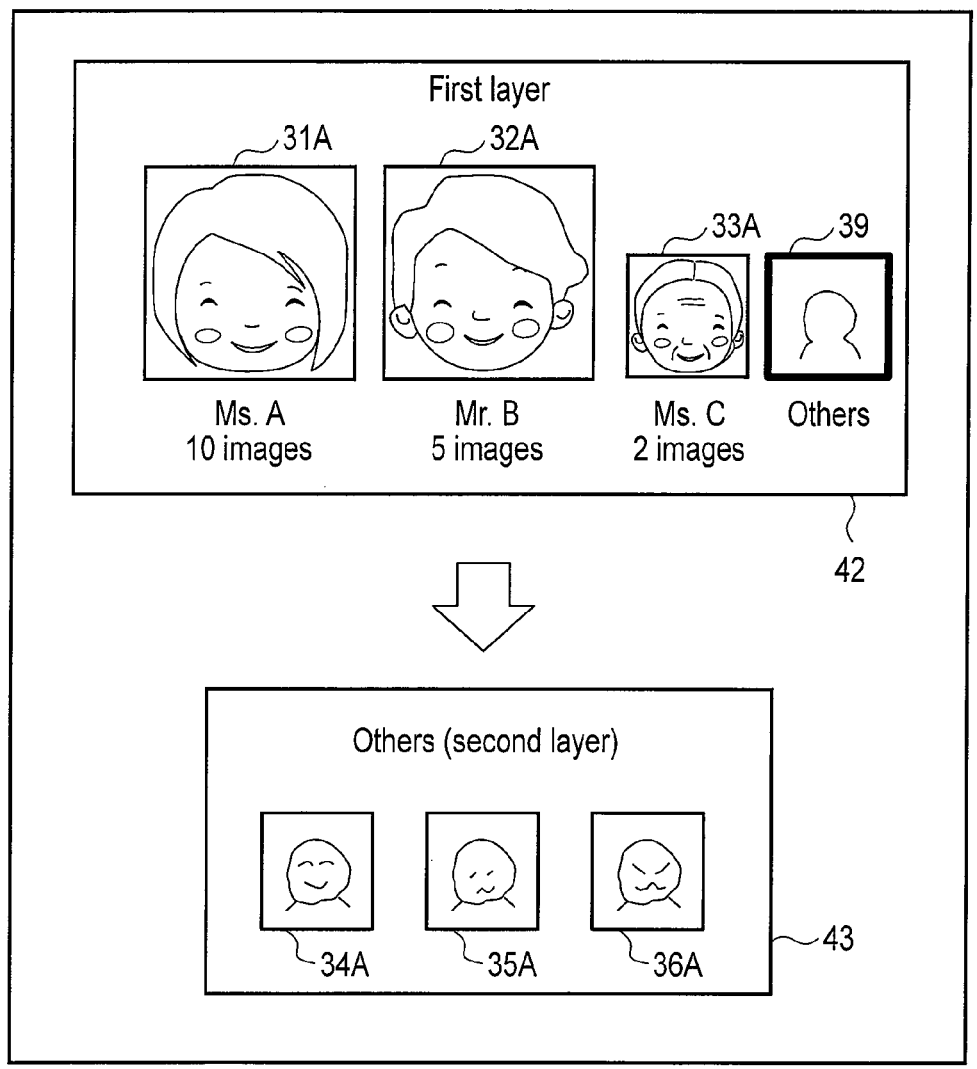
FIG. 6 is a view illustrating an example of a list of representative images of a lower layer, the list being displayed by the electronic apparatus of the embodiment.

Considering this, in the embodiment, as illustrated in FIG. 5, representative images 31A to 36A, which are associated with groups 31 to 36 into which images have been classified, are displayed based on numbers of images in the respective groups. For example, representative images 31A to 36A of groups 31 to 36, are displayed such that the user can distinguish the groups 31 to 36 between groups (first groups) in which the number of classified images is equal to or more than a threshold and groups (second groups) in which the number of classified images is less than the threshold.

In a list 42 shown in FIG. 5, groups 31 to 33 in which the number of classified images is two or more and groups 34 to 36 in which the number of classified images is less than two (i.e. one) are distinguishably displayed. To be more specific, representative images 31A to 33A, which are associated with the groups 31 to 33 in which the number of classified images is two or more, are displayed on a first layer (upper layer). Representative images 34A to 36A, which are associated with the groups 34 to 36 in which the number of classified images is less than two, are not displayed on the first layer, and instead a representative image 39 of "Others", which represents the groups 34 to 36 together, is displayed on the first layer.

The representative images 31A and 32A, which are associated with the groups 31 and 32 in which the number of classified images is five or more, are displayed with a larger size than the representative image 33A, which is associated with the group 33 in which the number of classified images is less than five.

In addition, the displayed size of the representative images 31A and 32A are larger than a displayed size of the representative image 39 of "Others", which represents the groups 34, 35 and 36 together.

In response to selection of one of the representative images 31A, 32A and 33A in the list 42, a list of images belonging to the group, which is associated with the selected representative image, is displayed on the screen.

In addition, in response to selection of the representative image 39 indicative of "Others", the screen displays a list 43 of a second layer (lower layer). The second layer includes representative images 34A, 35A and 36A which are associated with the groups 34, 35 and 36 corresponding to the representative image 39 (i.e. the groups 34, 35 and 36 which are put together by the representative image 39). Specifically, the representative images 34A, 35A and 36A, which are associated with the groups 34, 35 and 36, are included in the lower layer of the representative image 39 indicative of "Others". Then, in response to selection of one of the representative images 34A, 35A and 36A in the list 43, an image belonging to the group, which is associated with the selected representative image, is displayed on the screen.

It is assumed that a group with a large number of classified images is a group including images of the user himself/herself, or a group of a person who is close (important) to the user (for example, a family member or a friend). In addition, it is assumed that a group with a small number of classified images is a group of a person who is not closely related to the user (for example, a group of a person who was photographed by chance). Thus, as described above, based on the numbers of images classified into the groups, the representative images of persons (groups), whom the user is highly likely to search for, are displayed more noticeable than the representative images of the other groups (persons). Thereby, the user can easily acquire images of a desired person.

Figure 7:
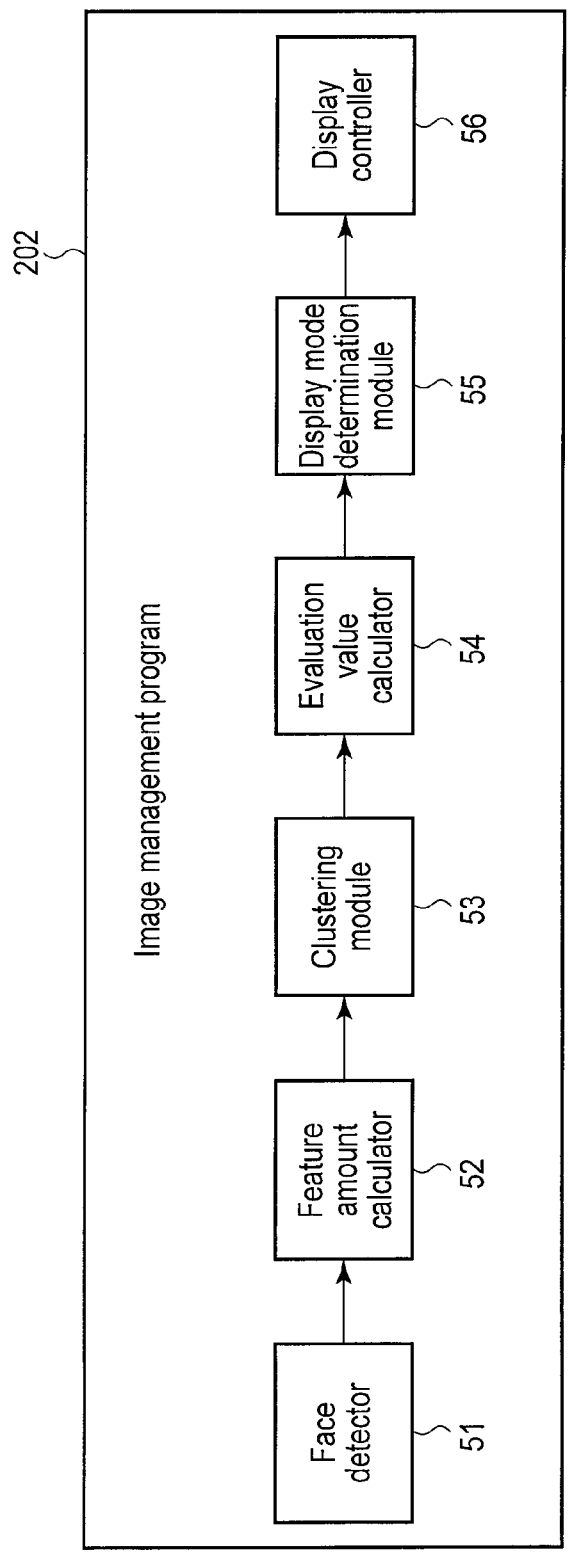
FIG. 7 is a block diagram illustrating an example of a functional configuration of an image management program executed by the electronic apparatus of the embodiment.

FIG. 7 illustrates an example of a functional configuration of the image management program 202 executed by the tablet computer 10. The image management program 202 includes, for example, a face detector 51, a feature amount calculator 52, a clustering module 53, an evaluation value calculator 54, a display mode determination module 55, and a display controller 56. The image management program 202 can set, as a target of management, images (photos) stored in a storage device or a storage medium built in the computer 10 or is externally connected, or stored in a storage device in another computer connected to the computer 10 over a network.

The face detector 51 detects face images from images (photos) which are the target of management. One image may include a plurality of face images, or may include no face image. For example, by using pixel values of pixels in an image, the face detector 51 detects an area (face image area), which is estimated to include a face image, from the image. The face image area is, for instance, a rectangular area which circumscribes the face image.

The face detector 51 outputs data indicative of the detected face image area to the feature amount calculator 52. The data indicative of the detected face image area includes, for example, the position and size of the face image area on the image (photo).

Using pixel values of pixels in the detected face image area, the feature amount calculator 52 calculates a feature amount of the face image (for example, a feature amount indicative of a color or a shape of an object in the face image area). When the face detector 51 has detected a plurality of face images from a plurality of images, the feature amount calculator 52 calculates a plurality of feature amounts corresponding to the plural face images.

In addition, the feature amount calculator 52 calculates a frontality and a sharpness of the face image by using the calculated feature amount. The frontality of the face image is indicative of the degree at which the face image is directed to the front. For example, a high value is set for the frontality of a full-faced image, and a low value is set for the frontality of a half-faced image. The sharpness of the face image is indicative of the degree of sharpness of the face image. For example, a high value is set for the sharpness of a face image which is in focus, and a low value is set for the sharpness of a face image which is out of focus (a so-called "blurred" face image).

The clustering module 53 classifies, based on detected face images, images (photos) including these face images into groups (clusters) 31 to 36. To be more specific, the clustering module 53 clusters the images (photos) which include face images, based on the feature amounts of face images, which have been calculated by the feature amount calculator 52. By classifying face images into similar face images, the clustering module 53 classifies the images (photos) including these face images into the groups 31 to 36. Specifically, the clustering module 53 classifies images (photos) including face images, which are estimated to represent the face of the same person, into the same group. For example, based on the detected face images, the clustering module 53 classifies one or more images corresponding to a first face (a face of a first person) into a first group, one or more images corresponding to a second face (a face of a second person) into a second group, . . . , and one or more images corresponding to an n-th face (a face of an n-th person) into an n-th group.

In addition, even when a first image of the images includes a first face image corresponding to the first face, the clustering module 53 may not classify the first image into the first group if a condition of photography of the first face image includes a first condition. The condition of photography is determined at least either a position of the first face image in the first image or a focused position in the first image. The first condition includes a condition of the first face image being not photographed near the center of the first image and/or a condition of the first face image being blurred.

One image including a plurality of face images may be classified into a plurality of groups. For example, when an image corresponding to the first face and an image corresponding to the second face have been detected from a first image (photo) of images, the clustering module 53 classifies the first image (photo) into both the first group and the second group. Even when at least one of a first face image corresponding to the first face and a second face image corresponding to the second face has been detected from a second image (photo) of images, the clustering module 53 may not classify the second image (photo) into the first group or the second group, depending on the condition of photography of the first face image or the second face image. The condition of photography of the first face image or the second face image is determined based on at least one of the position of the first face image or the second face image and the focus of the first face image or the second face image (e.g. whether the face is in focus and clear). This condition of photography may be determined, for example, based on an evaluation value of the face image calculated by the evaluation value calculator 54 (to be described later). For example, when the evaluation value of the first face image is less than a threshold, the clustering module 53 does not classify the second image into the first group. When the evaluation value of the second image is less than the threshold, the clustering module 53 does not classify the second image into the second group.

Based on the result of classification, the clustering module 53 generates an entry of group data corresponding to each group. Incidentally, the clustering module 53 may recognize persons corresponding to respective groups by using feature amounts of face images of persons prepared in advance.

FIG. 8 illustrates a structure example of the group data (also referred to as "cluster data"). The group data includes a plurality of entries corresponding to a plurality of groups (clusters). In each of the plural groups, for example, one or more images (photos) including face images, which are estimated to represent the same person, are classified. Accordingly, it can be said that a certain group is associated with a certain person.

Each of the entries includes, for example, a group number, a name, a number of images, etc. In the entry corresponding to a certain group, "Group number" is indicative of a number (identification information) which is given to the group. "Name" is indicative of a name which is given to the group, for instance, the name of a person associated with the group. "Number of images" is indicative of the number of images classified into the group.

The method of detecting and classifying (clustering) face images is not limited to the above-described method, and any method can be used.

Next, the evaluation value calculator 54 calculates an evaluation value of a face image (hereinafter also referred to as "face image evaluation value") and an evaluation value of a group (also referred to as "group evaluation value"). To be more specific, the evaluation value calculator 54 calculates the face image evaluation value by using the position, size, frontality, sharpness, etc. of the face image. The face image evaluation value is, for example, a value based on the importance of the face image in the image (photo) (e.g. whether the face image is photographed near the center, or whether the face image is photographed with a large size), and the quality of the face image (e.g. whether the face image is photographed in the frontal direction, or whether the face image is photographed with sharpness). Accordingly, a high face image evaluation value is set for, for example, a face image which is positioned near the center of the image, a face image with a large size on the image (a face image with a predetermined size or more), a face image with high frontality, or a face image with high sharpness.

In addition, the evaluation value calculator 54 calculates the group evaluation value by using the number of images belonging to the group, and the face image evaluation value of the face image in the image belonging to the group. The group evaluation value is indicative of the importance of the group for the user who manages the images, and the quality of images belonging to the group. Accordingly, a higher value is set for the group evaluation value, for example, as the number of images classified into the group is larger and the face image evaluation value of the face image in the image belonging to the group is higher. In the meantime, when a plurality of face images are included in the image in the group, the face image evaluation value of the face image corresponding to the group (i.e. the face image of the person corresponding to the group) is used. In addition, the calculated group evaluation value may be included in the corresponding entry in the above-described group data.

The feature amount calculator 52, clustering module 53 and evaluation value calculator 54 generate entries of the face image data by using the above-described process result.

FIG. 9 illustrates a structure example of the face image data. The face image data includes a plurality of entries corresponding to a plurality of face images. Each of the entries includes, for example, a face image ID, an image ID, a group number, a position, a size, frontality, sharpness, an evaluation value, etc. In the entry corresponding to a certain group, "Face image ID" is indicative of identification information which is given to the face image. "Image ID" is indicative of identification information of an image including the face image. "Group number" is indicative of the number (identification information) of the group into which the image including the face image is classified.

"Position" is indicative of a position (e.g. X coordinate and Y coordinate) of the face image on the image. "Size" is indicative of the size of the face image on the image. The "Size" is indicative of, for example, a size of a rectangle containing the face image (a rectangle including the face image). "Frontality" is indicative of the degree of frontality of the face image. "Sharpness" is indicative of the degree of sharpness of the face image. A value based on various values relating to the image quality, such as a degree of focusing, a degree of noise, and a contrast, is set for "Sharpness". "Evaluation value" is indicative of an evaluation value of the face image. A face image evaluation value, which is calculated based on, for example, values of "Position", "Size", "Frontality" and "Sharpness", is set for the "Evaluation value".

The display mode determination module 55 determines a display mode of a plurality of representative images which are associated with the groups 31 to 36, into which the images have been classified, by using at least either the group data or the face image data. The representative image, which is associated with the group, is, for example, one of a plurality of face images in a plurality of images belonging to the group. In addition, this representative image may be an image which is predetermined in association with each group. The display mode determination module 55 determines, for example, the display mode of a plurality of representative images associated with plural groups 31 to 36 into which plural images have been classified, based on at least either the number of images classified into each group or the group evaluation value of each group.

As has been described above with reference to FIG. 5, for example, the display mode determination module 55 determines a display mode in which the plural representative images 31A to 36A associated with the plural groups 31 to 36 are displayed such that the groups 31 to 36 can be distinguished between the first group and the second group. The number of classified images in the first group is equal to or more than the threshold. The number of classified images in the second group is less than the threshold. Specifically, the display mode determination module 55 determines a display mode in which the representative image of the first group and the representative image of the second group are distinguishably displayed, when the number of images in the first group is the threshold or more and the number of images in the second group is less than the threshold.

To be more specific, the display mode determination module 55 determines, for example, that the representative images 31A to 33A associated with the groups 31 to 33 in which the number of classified images is a first threshold (two in the example of FIG. 5) or more, are displayed on the first layer (upper layer). Then, the display mode determination module 55 determines, for example, that the representative images 34A to 36A associated with the groups 34 to 36 in which the number of classified images is less than the first threshold (two), are not displayed on the first layer but are displayed on the second layer (lower layer) lower than the first layer. The display mode determination module 55 also determines that the image 39 of "Others", which represents the groups 34 to 36 together, is displayed on the first layer.

Furthermore, the display mode determination module 55 detects the representative images 31A and 32A associated with the groups 31 and 32 in which the number of classified images is a second threshold (five in the example of FIG. 5) or more. The display mode determination module 55 also detects the representative image 33A associated with the group 33 in which the number of classified images is less than the second threshold (five). Based on the detected result, the display mode determination module 55 determines that the representative images 31A and 32A are displayed with a larger size than the representative image 33A, and than the representative image 39 of "Others" which represents the groups 34, 35 and 36 together.

In the meantime, the display mode determination module 55 may determine the display mode of the representative images associated with the groups, by using the group evaluation values calculated by the evaluation value calculator 54, instead of the number of images classified into the groups. For example, the display mode determination module 55 detects the first group in which the group evaluation value is the threshold or more and the second group in which the group evaluation value is less than the threshold. Then, the display mode determination module 55 determines a display mode in which the plural representative images 31A to 36A associated with the plural groups 31 to 36 are displayed such that the groups 31 to 36 can be distinguished between the first group and the second group. Specifically, the display mode determination module 55 determines a display mode in which the representative image of the first group and the representative image of the second group are distinguishably displayed, when the group evaluation value of the first group is the threshold or more and the group evaluation value of the second group is less than the threshold.

To be more specific, the display mode determination module 55 determines, for example, that the representative images 31A to 33A, which are associated with the groups 31 to 33 in which the group evaluation value is the first threshold or more, are displayed on the first layer (upper layer). Then, the display mode determination module 55 determines, for example, that the representative images 34A to 36A, which are associated with the groups 34 to 36 in which the group evaluation value is less than the first threshold, are displayed on the second layer (lower layer). The display mode determination module 55 also determines that the image 39 of "Others", which represents the groups 34 to 36 together, is displayed on the first layer.

Furthermore, the display mode determination module 55 detects the representative images 31A and 32A, which are associated with the groups 31 and 32 in which the group evaluation value is the second threshold or more. The display mode determination module 55 also detects the representative image 33A, which is associated with the group 33 in which the group evaluation value is less than the second threshold (five). Then, the display mode determination module 55 determines that the representative images 31A and 32A are displayed with a larger size than the representative image 33A and than the representative image 39 of "Others" which represents the groups 34, 35 and 36 together.

The display controller 56 displays a list of representative images (representative face images) associated with the respective groups, based on the display mode determined by the display mode determination module 55. For example, based on the layer and size determined by the display mode determination module 55, the display controller 56 displays the list 42 of the first layer, which includes at least a part of the representative images associated with the groups.

The list of representative images 31A to 36A, which are associated with the groups 31 to 36, may be displayed in any display mode if the first group in which the group evaluation value is the threshold or more and the second group in which the group evaluation value is less than the threshold can be distinguished. In addition, the number of images belonging to each group may be used as the group evaluation value.

The display modes for distinguishing the first group and second group include, for example, a display mode in which the representative image of the first group is displayed on the upper layer and the representative image of the second group is displayed on the lower layer so that the representative image of the first group may be more noticeable than the representative image of the second group; a display mode in which the representative image of the first group is displayed with a first size and the representative image of the second group is displayed with a second size that is smaller than the first size; a display mode in which a predetermined mark or frame is drawn on the representative image of the first group; a display mode in which an effect is applied to the representative image of the first group; a display mode in which only the representative image of the first group is displayed and the representative image of the second group is not displayed; and a display mode in which a list including representative images of the first group and a list including representative images of the second group are separately displayed. The display mode determination module 55 determines that at least one of these display modes is used in order to display the representative images 31A to 36A.

Furthermore, as illustrated in FIG. 10, the display mode determination module 55 and display controller 56 may display the representative images 31A and 32A of the groups 31 and 32 (first group), in which the group evaluation value is the threshold or more, in a first area including the center of the screen 45 (the window displayed on the screen). The display mode determination module 55 and display controller 56 may also display the representative images 33A to 36A of the groups 33 to 36 (second group), in which the group evaluation value is less than the threshold, in an area excluding the first area. For example, the display mode determination module 55 and display controller 56 display the representative images 31A and 32A of the groups 31 and 32, in which the group evaluation value is the threshold or more, with a large size near the center of the screen 45. Then, the display mode determination module 55 and display controller 56 display the representative images 33A to 36A of the groups 33 to 36, in which the group evaluation value is less than the threshold, at positions at greater distances from the center of the screen 45 as the group evaluation value becomes smaller. In addition, the representative images 33A to 36A may be displayed with smaller sizes as the group evaluation value becomes smaller.

Besides, when a plurality of face images are detected from one image (photo), the feature amount calculator 52 may detect a combination of face images (persons) detected from one image. Based on a combination of face images which are frequently detected from one image (i.e. a combination of face images with a high co-occurrence probability in one image), the display mode determination module 55 and display controller 56 can display the representative images of the groups corresponding to the face images of this combination at close positions (e.g. neighboring positions) on the screen 45.

Thereby, the representative images are displayed on the screen 45 by taking into account the relationship between the groups, that is, the relationship between the persons corresponding to the groups. Thus, since a desired person can easily be searched for, the images of the desired person can easily be acquired.

Next, referring to a flowchart of FIG. 11, a description is given of an example of the procedure of a face clustering process executed by the tablet computer 10.

To start with, the face detector 51 detects a face image included in each of images (photos) (block B11). The feature amount calculator 52 calculates a feature amount of the detected face image by using pixel values of pixels in the detected face image (block B12). When a plurality of faces images are detected from a plurality of images by the face detector 51, the feature amount calculator 52 calculates a plurality of feature amounts corresponding to these face images.

Based on the calculated feature amounts, the clustering module 53 clusters the face images (block B13). The clustering module 53 classifies the face images into each cluster (group) of similar face images. Specifically, the clustering module 53 classifies the face images, which are estimated to represent the face of the same person, into the same cluster.

Next, referring to a flowchart of FIG. 12, a description is given of an example of the procedure of a display control process executed by the tablet computer 10. It is assumed that at least one image is classified into each cluster (group).

To start with, the display mode determination module 55 sets 0 for a variable n which is indicative of the number given to a cluster (group) which is a process target (block B21). That is, the display mode determination module 55 determines an n-th (n=0) cluster to be the cluster of the process target.

Then, the display mode determination module 55 determines whether the number of face images included in the n-th cluster is one or not (block B22). When the number of face images included in the n-th cluster is one (YES in block B22), the display mode determination module 55 adds the n-th cluster to items which are displayed on a second layer (lower layer) (block B23). Specifically, the display mode determination module 55 determines that the representative image associated with the n-th cluster is displayed on the second layer.

On the other hand, when the number of face images included in the n-th cluster is not one (NO in block B22), the display mode determination module 55 determines whether the number of images included in the n-th cluster is greater than a threshold (block B24).

When the number of images included in the n-th cluster is greater than the threshold (YES in block B24), the display mode determination module 55 adds the n-th cluster to items which are displayed on a first layer with a first size (block B25). Specifically, the display mode determination module 55 determines that the representative image associated with the n-th cluster is displayed on the first layer with the first size.

When the number of images included in the n-th cluster is the threshold or less (NO in block B24), the display mode determination module 55 adds the n-th cluster to items which are displayed on the first layer with a second size which is smaller than the first size (block B26). Specifically, the display mode determination module 55 determines that the representative image associated with the n-th cluster is displayed on the first layer with the second size.

Subsequently, the display mode determination module 55 adds 1 to n (block B27), and determines whether this n is less than the total number of clusters or not (block B28). If the n is less than the total number of clusters (YES in block B28), the process returns to block B22, and a new n-th cluster is processed.

On the other hand, if the n is the total number of clusters or more (NO in block B28), that is, if the process of all clusters has been completed, the display controller 56 displays a list of representative images (face images) associated with the respective clusters, based on the determined layer and size (block B29).

As has been described above, according to the embodiment, images of a desired person can easily be acquired. It is assumed that a group with a large number of classified images (or a group with a high group evaluation value) is a group including images of the user himself/herself, or a group of a person who is close (important) to the user (for example, a group of a family member or a friend). In addition, it is assumed that a group with a small number of classified images is a group of a person who is not closely related to the user (for example, a group of a person who was photographed by chance).

The face detector 51 of the embodiment detects face images from images. Based on the detected face images, the clustering module 53 classifies the images into groups. Then, the display mode determination module 55 and display controller 56 display representative images associated with the groups, such that the groups are distinguished between the first group in which the number of classified images is equal to or more than a threshold and the second group in which the number of classified images is less than the threshold.

In this manner, in the embodiment, based on the numbers of images classified into the groups, the representative image of a person (first group), whom the user is highly likely to search for, is displayed more noticeable than the representative image of the other persons (second group) so that the representative images corresponding to the groups may be distinguished. Thereby, the user can easily acquire images of a desired person.

All the process procedures of the embodiment, which have been described with reference to the flowcharts of FIGS. 11 and 12, can be executed by software. Thus, the same advantageous effects as with the present embodiment can easily be obtained simply by installing a computer program, which executes the process procedures, into an ordinary computer through a computer-readable storage medium which stores the computer program, and by executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display control method comprising:
   detecting face images in images;
   classifying, based on the face images, one or more images corresponding to a first face into a first group and one or more images corresponding to a second face into a second group; and
   when a number of images in the first group satisfies a first condition and a number of images in the second group satisfies a second condition different from the first condition, displaying on a screen a first representative image associated with the first group that is distinguishable from a second representative image associated with the second group, the first representative image corresponding to one of images in the first group, the second representative image corresponding to one of images in the second group,
   wherein the number of images satisfying the first condition is more than the number of images satisfying the second condition,
   a first image of the images is not classified into the first group when the first image comprises a first face image corresponding to the first face and the first image satisfies a third condition of photography of the first face image, and
   the third condition of photography is determined based on at least either a position of the first face image in the first image or a focus of the first image.

2. The display control method of claim 1, wherein the first representative image is displayed with a larger size than the second representative image.

3. The display control method of claim 1, wherein the second representative image is not displayed.

4. The display control method of claim 1, wherein the first representative image is displayed on a first layer and the second representative image is displayed on a second layer lower than the first layer.

5. The display control method of claim 1, further comprising classifying a first image of the images into both the first group and the second group when the first image comprises a first face image corresponding to the first face and a second face image corresponding to the second face.

6. An electronic apparatus comprising:
a hardware processor configured to detect face images in images and classify, based on the face images, one or more images corresponding to a first face into a first group and one or more images corresponding to a second face into a second group; and
a display controller configured to display on a screen, when a number of images in the first group satisfies a first condition and a number of images in the second group satisfies a second condition different from the first condition, a first representative image associated with the first group that is distinguishable from a second representative image associated with the second group, the first representative image corresponding to one of images in the first group, the second representative image corresponding to one of images in the second group,
wherein the number of images satisfying the first condition is more than the number of images satisfying the second condition,
a first image of the images is not classified into the first group when the first image comprises a first face image corresponding to the first face and the first image satisfies a third condition of photography of the first face image, and
the third condition of photography is determined based on at least either a position of the first face image in the first image or a focus of the first image.

7. The electronic apparatus of claim 6, wherein the display controller is configured to display the first representative image with a larger size than the second representative image.

8. The electronic apparatus of claim 6, wherein the display controller is configured not to display the second representative image on the screen.

9. The electronic apparatus of claim 6, wherein the display controller is configured to display the first representative image on a first layer, and to display the second representative image on a second layer lower than the first layer.

10. A computer-readable, non-transitory storage medium having stored thereon a program for display control which is executable by a computer, the program controlling the computer to execute functions of:
detecting face images in images;
classifying, based on the face images, one or more images corresponding to a first face into a first group and one or more images corresponding to a second face into a second group; and
when a number of images in the first group satisfies a first condition and a number of images in the second group satisfies a second condition different from the first condition, displaying on a screen a first representative image associated with the first group that is distinguishable from a second representative image associated with the second group, the first representative image corresponding to one of images in the first group, the second representative image corresponding to one of images in the second group,
wherein the number of images satisfying the first condition is more than the number of images satisfying the second condition,
a first image of the images is not classified into the first group when the first image comprises a first face image corresponding to the first face and the first image satisfies a third condition of photography of the first face image, and
the third condition of photography is determined based on at least either a position of the first face image in the first image or a focus of the first image.

11. The storage medium of claim 10, wherein the first representative image is displayed with a larger size than the second representative image.

12. The storage medium of claim 10, wherein the second representative image is not displayed.

13. The storage medium of claim 10, wherein the displaying comprises displaying the first representative image on a first layer, and displaying the second representative image on a second layer lower than the first layer.

* * * * *